(12) United States Patent
Pujet et al.

(10) Patent No.: US 7,924,734 B2
(45) Date of Patent: Apr. 12, 2011

(54) NETWORK CONFIGURATION OPTIMIZATION

(75) Inventors: Nicolas Pujet, Boulder, CO (US); David Rodrian, Denver, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 708 days.

(21) Appl. No.: 11/671,274

(22) Filed: Feb. 5, 2007

(65) Prior Publication Data

US 2008/0186873 A1 Aug. 7, 2008

(51) Int. Cl.
H04L 12/26 (2006.01)
H04L 12/28 (2006.01)
H04J 3/22 (2006.01)

(52) U.S. Cl. .................. 370/252; 370/255; 370/466

(58) Field of Classification Search .......... 370/252, 370/254, 255, 464, 465, 352, 238
See application file for complete search history.

(56) References Cited

U.S. PATENT DOCUMENTS

| | | | | |
|---|---|---|---|---|
| 5,337,352 A * | 8/1994 | Kobayashi et al. | ........... | 379/234 |
| 5,953,319 A * | 9/1999 | Dutta et al. | ................... | 370/238 |
| 6,016,307 A * | 1/2000 | Kaplan et al. | ................ | 370/238 |
| 6,411,946 B1 * | 6/2002 | Chaudhuri | ..................... | 706/21 |
| 6,597,686 B1 * | 7/2003 | Smyk | ........................... | 370/352 |
| 6,782,429 B1 * | 8/2004 | Kisor | .......................... | 709/241 |
| 6,804,532 B1 * | 10/2004 | Moon et al. | ................ | 455/552.1 |
| 6,981,055 B1 * | 12/2005 | Ahuja et al. | ................. | 709/238 |
| 7,447,153 B2 * | 11/2008 | Klinker | ........................ | 370/231 |
| 2003/0142627 A1 * | 7/2003 | Chiu et al. | .................... | 370/238 |
| 2003/0179717 A1 * | 9/2003 | Hobbs et al. | ................. | 370/254 |
| 2003/0206526 A1 * | 11/2003 | Phan et al. | .................... | 370/238 |
| 2004/0136324 A1 * | 7/2004 | Steinberg et al. | ............ | 370/238 |
| 2005/0073962 A1 * | 4/2005 | Zabele et al. | ................ | 370/254 |
| 2005/0114153 A1 * | 5/2005 | Hodges et al. | .................... | 705/1 |
| 2005/0265239 A1 * | 12/2005 | Previdi et al. | ................ | 370/238 |
| 2007/0133427 A1 * | 6/2007 | Taylor et al. | ................ | 370/252 |

FOREIGN PATENT DOCUMENTS

WO WO 2004/064307 A2 7/2004

OTHER PUBLICATIONS

International Searching Authority, U.S. Patent and Trademark Office and Receiving Office, International Search Report (Form PCT/ISA/210) for international application No. PCT/US2008/052629, Jul. 11, 2008, 3 pages.
International Searching Authority, U.S. Patent and Trademark Office and Receiving Office, Written Opinion of the International Searching Authority (Form PCT/ISA/237) for international application No. PCT/US2008/052629, Jul. 11, 2008.

* cited by examiner

*Primary Examiner* — Warner Wong
(74) *Attorney, Agent, or Firm* — John C. Heuton

(57) ABSTRACT

A method for optimizing a network configuration of network resources includes receiving service attribute data associated with network resources and the traffic demand, based at least in part on the service attribute data, determining one or more network resources for providing communication between end user devices and a carrier network, i.e., one or more metro and/or backbone networks, and determining an optimal configuration of the one or more network resources within the network, wherein the optimal configuration optimizes one or more predetermined criteria. A system for optimizing a configuration of network resources includes a computer-readable medium including service attribute data descriptive of a plurality of network resources, a preprocessing module operable to receive the one or more service attributes and determine a set of one or more resources and transmission modes between the end user devices and the carrier network, and an optimization module operable to determine an optimum configuration of the resources and transmission modes within the network.

20 Claims, 6 Drawing Sheets

| Network Node ID | Costs for Transmission Mediums Types | | | Best |
|---|---|---|---|---|
| | 3rd party | Wireless | Constructed Fiber | |
| NWN1 | 1st DS1 | 1st DS1 | 1st DS1 | |
| | Subsequent DS1 | Subsequent DS1 | Subsequent DS1 | |
| | 1st DS3 | 1st DS3 | 1st DS3 | |
| | Subsequent DS3 | Subsequent DS3 | Subsequent DS3 | |
| NWNi | | ... | | ... |
| NWNn | | | | |

FIG. 4

NETWORK CONFIGURATION OPTIMIZATION

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2006 Level 3 Communications, Inc.

TECHNICAL FIELD

Embodiments of the present invention generally relate to configuration of a communication network.

BACKGROUND

As the demand for wireless communication services increases, communication service providers must continue to grow and adapt to meet that demand. Fundamentally, service providers need to connect their equipment, such as equipment at a base station, enterprise, home or building, to a network connection point, such as a metropolitan or backbone network.

In addition to the increasing demand for mobile data and voice services, data and voice services originating at non-nomadic locations, such as enterprise buildings or residential homes is also increasing. While the majority of this traffic is currently served by wireline technologies such as a T1 line, wireless technologies have developed to the stage where they too may now be used to serve this demand. This creates numerous possibilities for the network configuration. Thus network providers are faced with the often difficult challenge of optimally configuring the networks to meet certain business criteria, such as cost savings, and ease of access to aggregation points that provide connections to the broader network. Unfortunately, providers today lack tools that enable them to optimally configure their networks.

SUMMARY

Embodiments of the present invention generally relate to systems and methods for configuring a communication network. More specifically, embodiments relate to systems and methods for optimizing a network configuration. The optimization may involve determining an optimal set of communication resources in a network based on service attributes and/or costs. The optimization may also involve determining an optimal arrangement or allocation of the communication resources. The optimization may also involve determining one or more optimal transmission modes and/or media employed in the configuration of communication resources.

A method for optimizing a network configuration of network resources includes receiving service attribute data associated with network resources and the traffic demand, based at least in part on the service attribute data, determining one or more network resources for providing communication between end user devices and a backbone and/or metro network, and determining an optimal configuration of the one or more network resources within the network, wherein the optimal configuration optimizes one or more predetermined criteria.

A system for optimizing a configuration of network resources includes a computer-readable medium including service attribute data descriptive of a plurality of network resources, a preprocessing module operable to receive the one or more service attributes and determine a set of one or more resources and transmission modes between the end user devices and the metro and/or backbone network, and an optimization module operable to determine an optimum configuration of the resources and transmission modes within the network.

BRIEF DESCRIPTION OF THE DRAWINGS

FIG. 4 is a table that could be generated by the preprocessing module of FIG. 3, wherein multiple transmission mode costs have been computed for each of multiple network nodes.

Figure 1:
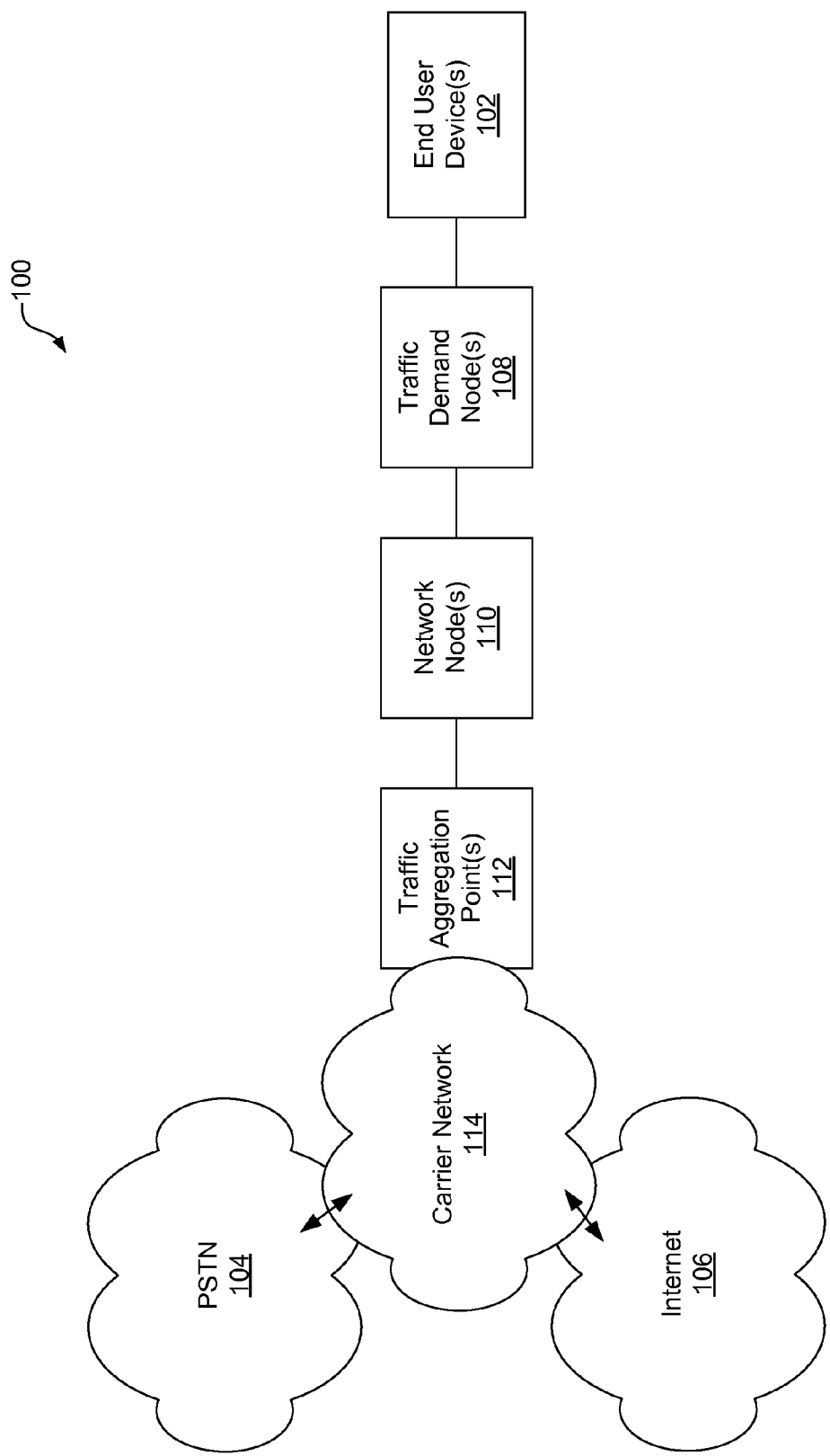
FIG. 1 illustrates an exemplary operating environment to which embodiments of the invention can be applied to optimize a network configuration.

While the invention is amenable to various modifications and alternative forms, specific embodiments have been shown by way of example in the drawings and are described in detail below. The intention, however, is not to limit the invention to the particular embodiments described.

DETAILED DESCRIPTION

Embodiments of the present invention relate to systems and methods for determining an optimized configuration of a system of network nodes. The configuration can be optimized according to one or more specified optimization criteria, such as, but not limited to, cost, bandwidth, or network constraints. The optimization is based on one or more input parameters, including, but not limited to, service attributes and costs. Service attributes may include, without limitation, network node parameters, metro and/or backbone network parameters, third party network parameters, traffic aggregation point parameters, traffic demand node parameters, and/or construction and equipment parameters.

Prior to describing one or more preferred embodiments of the present invention, definitions of some terms used throughout the description are presented.

DEFINITIONS

A "module" is a self-contained functional component. A module may be implemented in hardware, software, firmware, or any combination thereof.

The terms "connected" or "coupled" and related terms are used in an operational sense and are not necessarily limited to a direct connection or coupling.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment.

If the specification states a component or feature "may", "can", "could", or "might" be included or have a characteristic, that particular component or feature is not required to be included or have the characteristic.

The terms "responsive" and "in response to" includes completely or partially responsive.

The term "carrier network" refers to one or more metro and/or backbone networks.

The term "computer-readable media" is media that is accessible by a computer, and can include, without limitation, computer storage media and communications media. Computer storage media generally refers to any type of computer-readable memory, such as, but not limited to, volatile, non-volatile, removable, or non-removable memory. Communication media refers to a modulated signal carrying computer-readable data, such as, without limitation, program modules, instructions, or data structures.

The term "network node" generally refers to a communication point in a network that facilitates communication between end user communication devices and other points in a network. Network nodes could include, without limitation, communication-enabled buildings, communication-enabled vehicles, base stations or traffic aggregation points. Network nodes may be wired, wireless, or any combination thereof.

The term "network node system" generally refers to a system of network nodes. A network node system typically includes a set of communication resources, such as radios, relays, retransmitters, or others, which facilitate communication between end user devices and a backbone or core network. The communication resources communicate via one or more transmission modes and media, which may include a T1 line, fiber optic cable, copper wire, wireless, or other types. Exemplary transmission modes include Ethernet DS-1, DS-3, OC-3, OC-12, OC-24, OC-48, OC-96, OC-192 and OC-768, however, any digital signal transmission protocol, carrier line or signaling scheme is contemplated within the scope of the present invention such as, for example, the European line rate protocols E1-E3 and unused optical carrier lines OC-256, OC-384, OC-1536 and OC-3072.

The term "configuration" refers to an arrangement of things. When used in the context of embodiments described herein, a configuration may be comprised of a set of communication resources, such as network nodes or traffic demand nodes, and types of transmission modes or media interconnecting the communication resources. For example, a network configuration could specify the transmission modes for a backhaul channel from network nodes to a carrier network.

The term "transmission mode" refers to a type of communication technology and/or a communication carrier or signaling scheme. The transmission mode may be wired or wireless. Thus, for example, a transmission mode may be digital signal 1 (DS1) over fiber optic cable. As another example, a transmission mode may be DS3 over a point-to-point or point-to-multipoint wireless radio channel. The type of transmission mode is one parameter that can be specified during configuration optimization.

The term "traffic demand node" refers to a network node that carries communication traffic from another traffic demand node or end user devices to another network node. Types of traffic demand nodes include wired or wireless base stations, towers, radio sites, communication-enabled structures or vehicles, and others.

The term "traffic aggregation point" (TAP) refers to a network node that receives communication traffic from one or more network nodes and retransmits the received traffic as a whole. In embodiments described herein, a TAP typically retransmits communication traffic to a metropolitan or backbone network, or another TAP.

The term "service attribute" refers to a property associated with service provided in a communication network. By way of example, but not limitation, a service attribute may be a property of a network node or transmission medium.

Exemplary System

FIG. 1 illustrates an exemplary operating environment 100 to which embodiments of the invention can be applied to optimize a network configuration. One or more end user devices 102 communicate via voice and/or data over wide area networks (WANs), such as the public switched telephone network (PSTN) 104 and the Internet 106 through a system of network resources, which includes one or more traffic demand nodes 108 and network nodes 110.

End user devices 102 provide voice and/or data communication functionality, and can include, without limitation, cellular telephones, personal digital assistants (PDAs), handheld computers, Blackberries™, Voice over Internet Protocol (VoIP) communication devices (e.g., analog terminal adaptors, VoIP phones), desktop computers, or laptop computers. The end user devices 102 are often, but not necessarily, mobile. As such, end user devices 102 can communicate with the WANs from various locations such as, but not limited to, homes, offices, schools, or restaurants. The end user devices 102 contact the traffic demand nodes 108 in order to communicate with the WANs.

Traffic demand nodes 108 typically include a communication-enabled structure with communication devices, such as radio transmitters, receivers or other equipment. Accordingly, the traffic demand nodes 108 can include, without limitation, wired or wireless base stations (e.g., cell tower, wireless access point, repeater sites), buildings, standalone structures, moving or nonmoving vehicles, or central switching offices (e.g., rural carrier central offices (COs)). Traffic demand nodes 108 may represent businesses utilizing wired and/or wireless communications.

Also in the system are one or more network node(s) 110 which communicate with the traffic demand nodes 108 and one or more traffic aggregation points (TAPS) 112. TAPs 112 communicate with one or more carrier networks 114 that facilitate communication with the PSTN 104 and/or the Internet 106. Each network node 110 facilitates communication of traffic between one or more traffic demand nodes 108 and a TAP 112 over a transmission mode, which may comprise fiber optic cable, copper wire, wireless, T1 lines, or other technology, or any combination thereof. The network nodes 110 may include, without limitation, cell towers, buildings, or other structures that have communication equipment operable to communicate with the traffic demand nodes 108. The traffic demand nodes 108 and/or the network nodes 110 may communicate using point-to-point (PTP) links or point-to-multipoint links.

The TAPs 112 provide a centralized point from which communications can be distributed to the WANs or network nodes 110. TAPs 112 may include, without limitation, mobile switching centers, points of presence (POPs), or central offices. The carrier network 114 has equipment at the TAPs 112 to receive and transmit communications from the network nodes 110. The carrier network 114 also includes equipment to which the WANs connect. The equipment that provides these interfaces with the carrier network 114 may include, without limitation, gateways, gatekeepers, edge servers, cross-connects, or colocation centers (CO-LOs). The backbone typically includes ports on which TAPs 112 can be set up to connect to network nodes 110, such as "onramps", cable access points (CAPs), or splice points.

Although the carrier network 114 is illustrated as one network, this is merely for ease of illustration. In actual operation the carrier network 114 may include multiple networks or subnetworks. By way of example, but not limitation, the carrier network 114 may include a VoIP network and/or Internet service provider networks. Each of the PSTN 104 and/or the Internet 106 could also be composed of multiple networks or subnetworks.

Communication service providers typically provide the communication services through the traffic demand node(s) 108, and may deploy or maintain traffic demand node(s) 108. Regional telecommunications companies typically provide communication service through, and/or deploy or maintain, the network nodes 110, as well as the transmission channel between the network nodes 110 and the TAP(s) 112. At least in part because of this partitioning of services between the providers, in some cases, neither provider typically views or analyzes the entire communication path from the end user device 102 to the TAP 112 for purposes of configuration optimization.

As a result, the configuration of the communication resources (e.g., traffic demand nodes 108, network nodes 110, equipment, and/or transmission modes) in the network may not be optimal for the communication service providers. For example, a wireless service provider may access a network node of a regional telecommunications company to gain access to a fiber optic connection to the TAP, but may not realize that another regional telecommunications company or another communication medium rather than fiber optic (e.g., wireless, or a combination) is available that is less costly.

Embodiments of optimization systems and methods described herein generate network configurations that are optimized according to some criteria. The optimization is typically based on service attributes or costs related to communication resources in the network.

Figure 2:
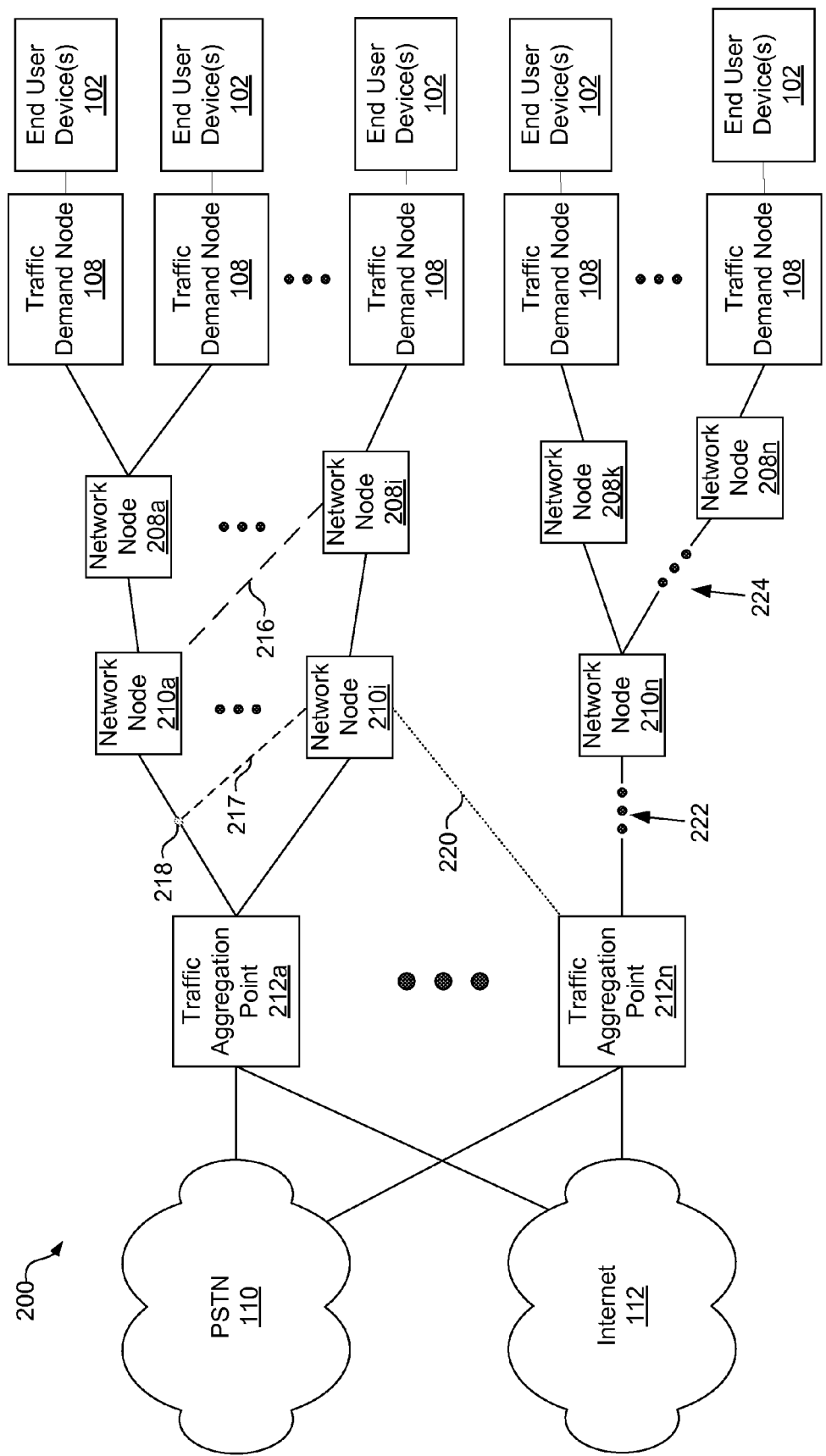
FIG. 2 illustrates an exemplary network configuration in accordance with one embodiment of the operating environment of FIG. 1.

FIG. 2 illustrates a particular exemplary network configuration 200 in accordance with one embodiment of the operating environment of FIG. 1. The configuration 200 includes one or more particular arrangements resources that could be employed, with reference to network nodes 208*a-n* and 210*a-n*. In the embodiment of FIG. 2, network nodes 208*a-n* and 210*a-n* may be cell towers, although, as discussed above, this need not be the case. Network nodes 208*a-n* and 210*a-n* may be structures (e.g., buildings), vehicles (e.g., trucks) or others. In addition, multiple TAPs 212*a-n* are illustrated. Of course, any number of network nodes 208, 210, and/or TAPs 212 may exist in an actual communications environment. It will be understood by those skilled in the art that the environment shown in FIG. 2 is merely an illustrative example, and that in actual operation numerous other arrangements can and will typically be implemented.

Embodiments of optimization systems described herein can determine optimal configurations of the network that may include one or more communication resources, such as network nodes 208, 210, and TAPs 212, and may employ one or more communication transmission modes and technologies. FIG. 2 facilitates illustration of a number of exemplary types of configuration optimizations and is not intended to limit the scope of the invention in any way.

In general, network nodes 208 and 210 facilitate communication between traffic demand nodes 102 and PSTN 110 and/or the Internet 112. To illustrate just one particular exemplary scenario, in FIG. 2 a first network node 208*a* and a second network node 208*i* handle communication traffic flowing between end users 102 and a first TAP 212*a*. The first network node 208*a* communicates with another network node 210*a*, and the second network node 208*i* communicates with network node 210*i*.

In accordance with various embodiments an optimization algorithm can optimize the network configuration. In this case, the optimization algorithm may indicate that a change in a current configuration would be more optimal according to some criteria. For example, the optimization algorithm may indicate that the network node 208*i* should communicate with network node 210*a*, rather than the network node 210*i*, in order to optimize some criteria, such as bandwidth allocation, cost, or to establish line-of-sight (LOS). The new allocation of network node 208*i* to the network node 210*a* is illustrated with dashed line 216.

As another example, optimal configuration results may indicate that traffic from two or more network nodes 210 should be aggregated at a common point prior to reaching the TAP 212, in order to reduce an excessive number of relays. This example is illustrated with a dotted line 217, illustrating a new connection between the network node 210*i* and a common relay point 218. In the new configuration, the traffic from the network node 210*a* and the traffic from the network node 210*i* will be aggregated at the aggregation point 218, which could thereby obviate the need for relays between the network node 210*i* and the TAP 212*a*.

Another example of configuration optimization includes determining that a network node currently channeling traffic to one TAP should channel traffic to a different TAP in order to optimize a specified criteria. For example, the network node 210*i* may change from communicating with TAP 212*a* to communicating with TAP 212*n*, as illustrated by dotted line 220.

Traffic between a network node 210 and a TAP 212 may go through one or more hops or relays. For example, ellipsis 222 represent one or more relays or hops between the network node 210*n* and the TAP 212*n*. Similarly, traffic between a network node 210 and a network node 208 may go through one or more hops or relays, as illustrated by ellipsis 224 between the network node 210*n* and the network node 208*n*. As is discussed in further detail below, embodiments of the present invention can analyze cost and service attributes to determine an optimal configuration in accordance with specified criteria. Service attributes include, without limitation, traffic demand and resources. The optimal configuration may indicate that a relay between a network node 210 and a TAP 212, or between a network node 210 and a network node 208 should be removed, or a new relay should be added in order to optimize the configuration.

The configuration optimization process may also indicate the type or types of transmission mediums used between network nodes and/or between network nodes and TAPs. For example, with reference to FIG. 2, the optimal configuration may have point-to-point communication between network node 210*n* and TAP 212*n*, with a combination of wired, fiber optic and/or wireless transmission modes. As another example, although not illustrated, any of the network nodes may employ point-to-multipoint communication between themselves and multiple other network nodes. The transmission channel from a network node to the TAP is referred to as a backhaul channel. The backhaul channel is connected to the carrier network at the TAP. In various embodiments described below, the transmission media employed in the backhaul channel are selected during the process of determining the optimal configuration.

Those skilled in the art will understand that there are numerous possible configurations of communication resource, such as network nodes. FIG. 2 illustrates only a few possible configurations, and only a few possible changes that may be made to configurations for purposes of optimization. Embodiments of the invention can determine optimized configurations for purposes of building and deploying a new network configuration, and/or determining optimized configurations for purposes of modifying an existing network.

Figure 3:
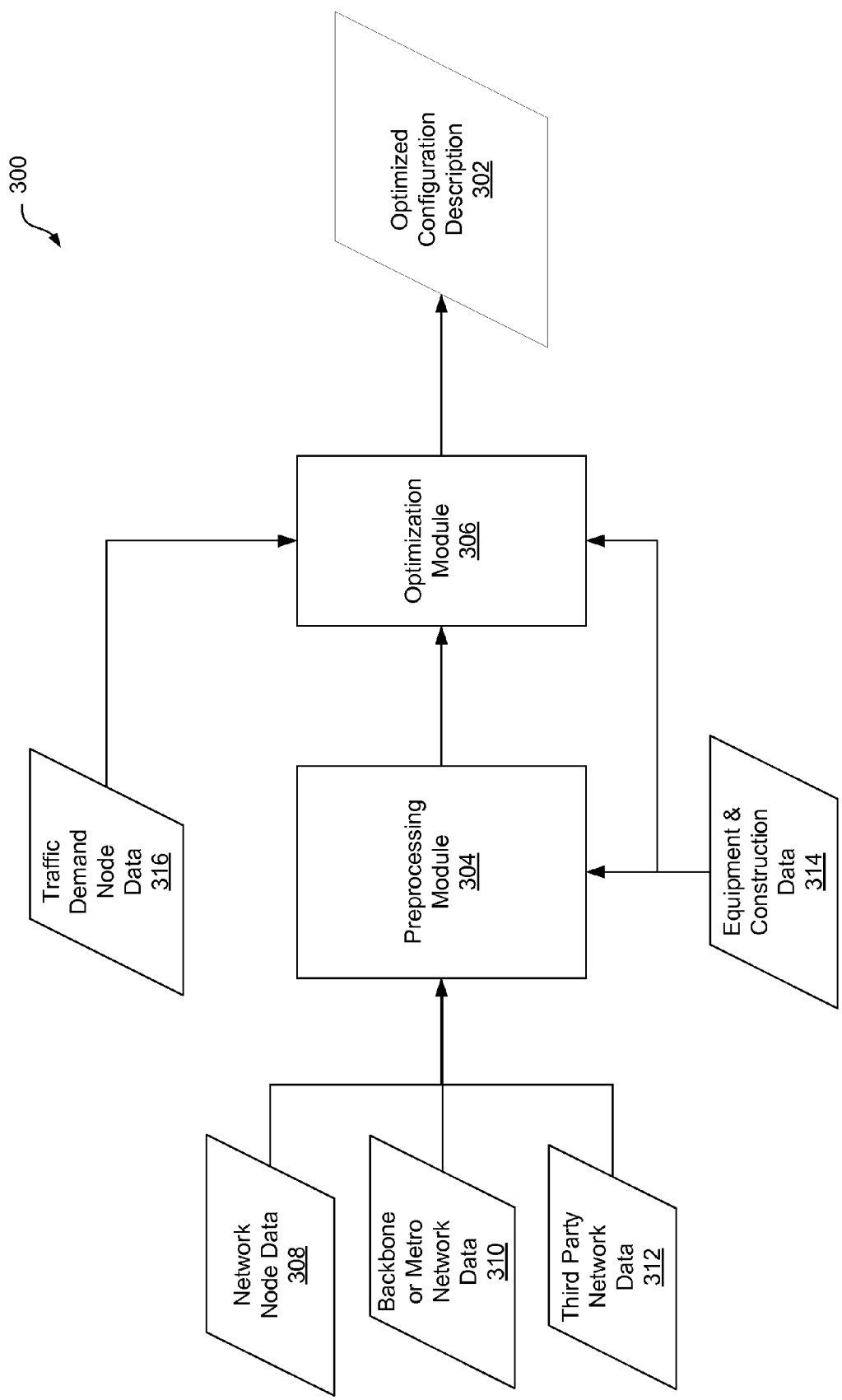
FIG. 3 is a block diagram illustrating an embodiment of an optimization system including functional modules operable to process and analyze one or more predetermined sets of input data to produce an optimized configuration description.

FIG. 3 is a block diagram illustrating an embodiment of an optimization system 300 including functional modules operable to process and analyze one or more predetermined sets of input data to produce an optimized configuration description 302. Briefly, the optimized configuration description 302 describes a configuration of a network, or a portion of a network, that is determined to be optimal according to one or more predetermined optimization criteria. The optimized configuration description 302 can be used to upgrade an existing network configuration, and/or to deploy a new network configuration.

In the embodiment of FIG. 3, the optimized configuration description 302 is generated through two general processes carried out by a preprocessing module 304 and an optimization module 306. Both modules receive input data such as service attributes and/or or costs. Such data may include, but is not limited to, parameters related to the various network nodes, equipment, transmission modes, geography, costs, etc. As discussed further below, the parameters may relate to nodes or equipment that are currently available on one or more networks, or nodes or equipment that can be built, deployed or installed.

For example, in one embodiment, the preprocessing module 304 receives four sets of data: network node data 308, backbone or metro network data 310, third party network data 312, and equipment and construction data 314. The network node data 308 includes service attributes associated with network nodes such as, without limitation, network node location, geographic parameters, rent and power costs data, interference data, line-of-sight limitations, or topographic data. Geographic parameters include elevation and structure and/or antenna height. The backbone/metro network data 310 generally includes service attributes related to available connections to the carrier network, to which the network nodes can connect to the backbone/metro network. Thus, the backbone/metro network data 310 can include, for example, "onramp" data, POP data, cable access points (CAPs), splice points, and/or inline amplification (ILA) data.

The third party network data 312 includes data related to third parties that provide network infrastructure and/or services that could be included in the optimal configuration. For example, the third party network data 312 might include CLX data, Regional Bell Operating Company (RBOC) network data, fabric provider data, onramp data, and/or circuit prices. The equipment and construction data 314 includes, without limitation, costs for installing fiber optic cables, wireless radios, acquisition of new sites, and/or radio rent and power. Costs for installing fiber optic cables typically includes the costs of trenching and the costs of electronics to light the fiber.

The preprocessing module 304 uses the input data sets to identify the lowest cost TAPs and network nodes, and transmission modes to connect to the metro and/or backbone network. In accordance with one embodiment, the preprocessing module 304 constructs a table, such as the table 400 shown in FIG. 4. The table 400 lists a plurality of network nodes (NWNs) in a Network Node ID column 402, and transmission mode costs in a column labeled costs of transmission mode types 404. The plurality of network nodes in column 402 include network node identifiers that may identify both currently available network nodes and network nodes that can be built. The costs of transmission mode types 404 includes backhaul costs associated with network nodes using various types of transmission modes.

In the exemplary table 400, the types of transmission modes analyzed are digital signal 1 (DS1) and DS3 costs associated with third party provider(s), wireless, and fiber optics. The costs are separated into costs for the first acquisition or installation and the costs for subsequent acquisition or installation, because in many cases, the initial installation or acquisition costs are substantially different (e.g., greater) than subsequent installation or acquisition. The costs can be determined as a function of carrier network onramp costs, fiber trenching costs, and other costs provided in the sets of input data.

For each network node, an optimal backhaul cost is allocated, which is calculated as the minimum of using a third party network to establish a transmission channel from the network node to the closest point on the carrier network. For example, the optimal backhaul costs may correspond to the cost of acquiring a third party DS1 connection between the network node and the closest point on the carrier network, or the cost of using point-to-point or point-to-multipoint radio communication channel between the network node and the carrier network, and/or using constructed fiber to establish a connection between the network node and the carrier network. After the optimal backhaul costs are determined, the preprocessing module 304 chooses the best (e.g., lowest cost) transmission mode for each of the network nodes, as shown by column 406 labeled "Best".

In one embodiment, the preprocessing module 304 outputs identifiers for the lowest cost network node(s) and the lowest cost transmission mode (e.g., DS3, fiber). The optimization module 306 receives the output of the preprocessing module 304 as well as the equipment and construction cost data 314 and a set of traffic demand node data 316.

In accordance with one embodiment of the optimization module 306, a greedy algorithm is employed. A greedy algorithm can be used to determine a weighted combination of costs and/or configuration element attributes. By way of example, but not limitation, the optimization module 306 can compute a weighted combination of the number of traffic demand nodes (e.g., base stations) served, the backhaul cost (s) generated by the preprocessing module 304, and/or profitability of the traffic demand nodes. The profitability of traffic demand nodes is an estimated profit associated with an incremental traffic demand node. Thus, the profitability is a measure of revenue relative to incremental costs to support the traffic demand node. Of course, the invention is not limited to using a greedy algorithm.

The optimization process carried out by the optimization module 306 also takes into account network node redundancy. Network node redundancy refers to multiple access nodes serving as "back-ups" for the other network node(s). For example, multiple network nodes may be desired at a point in a system of network nodes to provide redundancy in case one of the network nodes fails. In this example, if one of the network nodes fails, another network node can be substituted by reorienting a radio transmitter/receiver at the network node site.

Using the weighted combination and the network node multiplicity preferences, the optimization module 305 iteratively determines costs associated with different configurations of network nodes and transmission modes or media. For example, the optimization module 306 may iteratively allocate different combinations of traffic demand nodes to network nodes and determine the weighted combination described above to determine the optimal allocation of traffic demand nodes to network nodes. The optimal configuration may be selected according to optimization criteria, which may be the lowest cost configuration, the highest profitability configuration, or others. The optimization module 306 outputs the selected configuration to the optimized configuration description 302. The optimized configuration description 302 can be in any of various formats, such as a flat file, a set of related data objects, or a hierarchy of configuration elements.

Exemplary Operations

Figure 5:
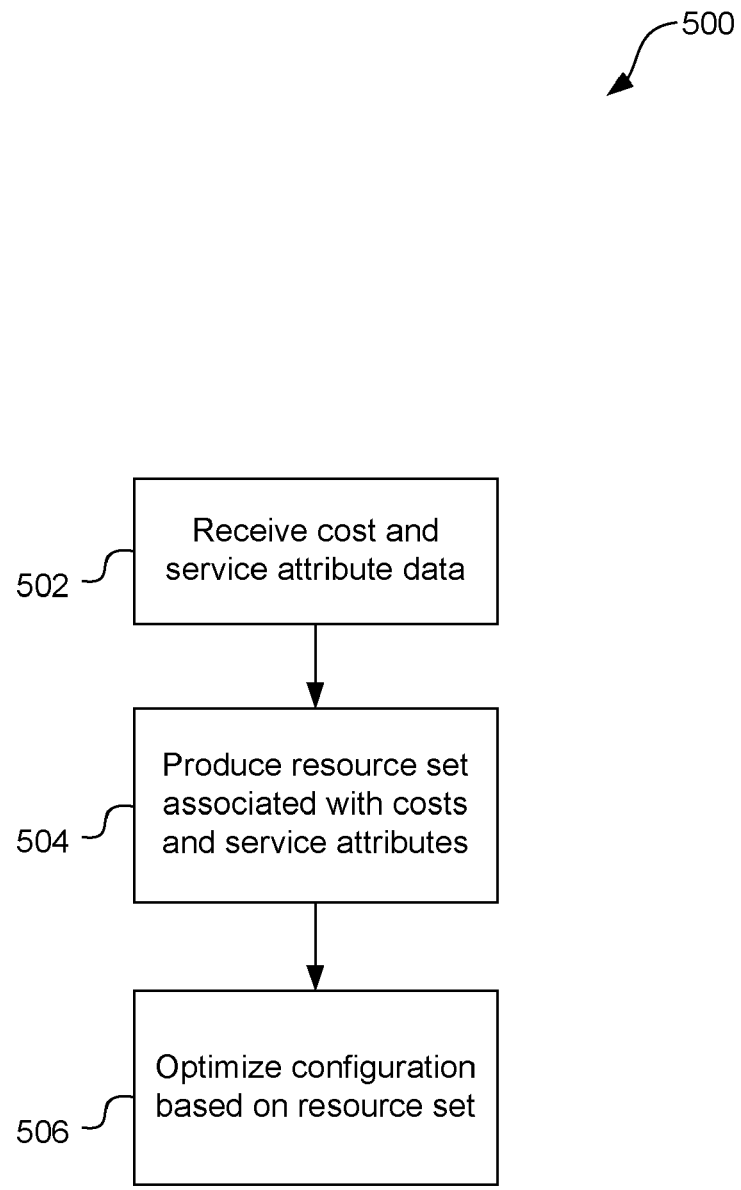
FIG. 5 illustrates an optimization algorithm that can be carried out by an optimization system, such as the network node system configuration optimization system of FIG. 3.

FIG. 5 illustrates an optimization algorithm 500 that can be carried out by an optimization system, such as the network configuration optimization system 300 of FIG. 3. In some embodiments, the operations of the algorithm 500 are implemented as software instructions that are executable by a computer to carry out the optimization.

Initially, a receiving operation 502 receives one or more service attributes and/or costs associated with network nodes. The service attributes and costs may be indicative of traffic demand, resource characteristics, and resource costs. The resource data may relate to existing resources that can be acquired and/or the resource data may relate to resources that do not exist, but need to be built, deployed, or installed. In one embodiment, the service attribute and cost data that are received in the receiving operation 502 include network node data, TAP data, equipment and construction data, carrier network data, traffic demand node data, and third party network data.

In a producing operation 504, a resource set is produced based on the service attribute and cost data. For example, in one embodiment of the producing operation 504, a low-cost network node is determined as well as a transmission mode between the network node and the carrier network. After producing the resource set, an optimizing operation 506 determines a configuration of network nodes and technologies that is optimal in accordance with one or more criteria. In one embodiment, the optimizing operation 506 may iteratively determine costs associated with different allocations of traffic demand nodes with network nodes. The optimizing operation 506 can optimize with constraints, such as, but not limited to, network node redundancy to improve fault tolerance during operation.

Exemplary Computing Device

Figure 6:
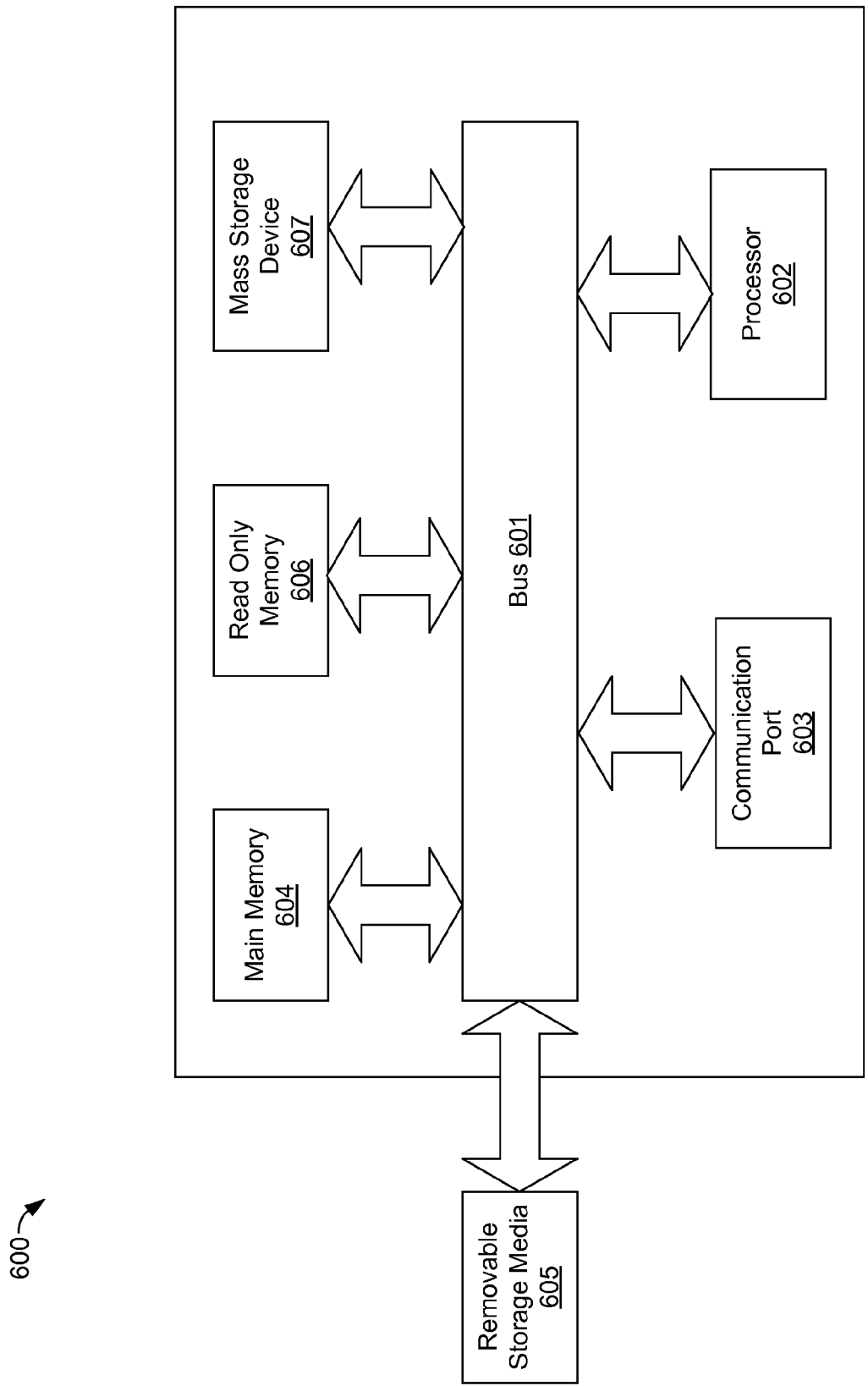
FIG. 6 is a schematic diagram of a computing device upon which embodiments of the present invention may be implemented and carried out.

FIG. 6 is a schematic diagram of a computing device 600 upon which embodiments of the present invention may be implemented and carried out. As discussed herein, embodiments of the present invention include various steps. A variety of these steps may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware.

According to the present example, the computing device 600 includes a bus 601, at least one processor 602, at least one communication port 603, a main memory 604, a removable storage media 605, a read only memory 606, and a mass storage 607. Processor(s) 602 can be any know processor, such as, but not limited to, an Intel® Itanium® or Itanium 2® processor(s), AMD® Opteron® or Athlon MP® processor (s), or Motorola® lines of processors. Communication port(s) 603 can be any of an RS-232 port for use with a modem based dialup connection, a 10/100 Ethernet port, a Gigabit port using copper or fiber, or a USB port. Communication port(s) 603 may be chosen depending on a network such a Local Area Network (LAN), Wide Area Network (WAN), or any network to which the computing device 600 connects. The computing device 600 may be in communication with peripheral devices (not shown) such as, but not limited to, printers, speakers, cameras, microphones, or scanners.

Main memory 604 can be Random Access Memory (RAM), or any other dynamic storage device(s) commonly known in the art. Read only memory 606 can be any static storage device(s) such as Programmable Read Only Memory (PROM) chips for storing static information such as instructions for processor 602. Mass storage 607 can be used to store information and instructions. For example, hard disks such as the Adaptec® family of SCSI drives, an optical disc, an array of disks such as RAID, such as the Adaptec family of RAID drives, or any other mass storage devices may be used.

Bus 601 communicatively couples processor(s) 602 with the other memory, storage and communication blocks. Bus 601 can be a PCI/PCI-X, SCSI, or USB based system bus (or other) depending on the storage devices used. Removable storage media 605 can be any kind of external hard-drives, floppy drives, IOMEGA® Zip Drives, Compact Disc—Read Only Memory (CD-ROM), Compact Disc—Re-Writable (CD-RW), Digital Video Disk—Read Only Memory (DVD-ROM).

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

What is claimed is:

1. A method for configuring a network to provide communication between end user devices and a carrier network, the method comprising:

receiving service attribute data associated with one or more network communication resources and traffic demand;

based at least in part on the service attribute data, selecting one or more network communication resources available to provide communication between the end user devices and the carrier network, the network communication resources being selected from a group comprising network nodes, traffic demand nodes, aggregation points, relays, network transmission media, and communication ports;

determining a plurality of costs corresponding to a plurality of different transmission modes that can be used to establish a communication channel between each of the one or more selected network communication resources and the carrier network; and analyzing the plurality of costs to render at least one transmission mode for use in establishing communication with the carrier network, wherein an optimal configuration for the network between the end user devices and the carrier network is defined at least in part using the one or more selected network communication resources, traffic demand nodes served by the carrier network, backhaul costs, profitability of the traffic demand nodes, and the rendered transmission mode(s).

2. The method as recited in claim 1, further comprising receiving cost data associated with one or more network resources and traffic demand, and wherein optimizing comprises computing a weighted combination of cost elements associated with the network resources and the traffic demand.

3. The method as recited in claim 1 wherein the plurality of transmission modes comprises a plurality of digital signal transmission protocols carried over a communication medium selected from a group consisting of fiber optic cables, wireless channels and third party communication lines.

4. The method as recited in claim 1 wherein determining an optimal configuration comprises iteratively determining a weighted combination of cost elements for each of a plurality of network resource allocations.

5. The method of claim 1 wherein the service attribute data comprises data concerning network communication resources that are currently available and network communications resources that can be built, deployed, or installed.

6. The method of claim 5 wherein the service attribute data concerning network communications resources that are currently available includes network node data, backbone or metro network data, third party network data, and the network communication resources that can be built, deployed, or installed includes equipment and construction data comprising costs for installing fiber, wireless radios, acquisition of new sites, and/or radio rent and power.

7. A system for configuring a network to provide communications between end user devices and a carrier network, the system comprising:
a computer-readable medium including service attribute data descriptive of a plurality of network communication resources, the network communication resources being selected from a group comprising network nodes, traffic demand nodes, aggregation points, and relays;
a preprocessing module operable to receive the one or more service attributes, select a plurality of network communication resources available for communication with the carrier network and further determine at least one transmission mode for use in provisioning communication between each of the selected plurality of network communication resources and the carrier network, wherein the preprocessing module determines the transmission mode by analyzing a plurality of costs corresponding to a plurality of transmission modes that can be used to establish a communication channel between each of the selected network communication resources and the carrier network; and
an optimization module operable to determine an optimal configuration for the network between the end user devices and the carrier network using at least the plurality of selected network communication resources, traffic demand nodes served by the carrier network, backhaul costs, profitability of the traffic demand nodes, and the determined transmission mode(s), wherein the optimization module is further operable to determine an optimal combination of traffic demand nodes served by the carrier network, backhaul costs, and profitability of the traffic demand nodes.

8. The system as recited in claim 7, wherein the optimization module is further operable to determine a cost associated with a selected allocation of network communication resources.

9. The system as recited in claim 7, wherein the preprocessing module is further operable to determine costs of combinations of a plurality of network communication resources, and select a combination of the network communication resources that optimizes one or more predetermined criteria.

10. The system as recited in claim 7 wherein the service attribute data comprises one or more of new equipment data related to installation of new equipment, third party data related to one or more third party network providers, and backbone data including one or more connection parameters for connecting to the carrier network.

11. The system as recited in claim 7, wherein the optimization module is further operable to determine the optimal configuration based on one or more constraints.

12. The system as recited in claim 7, wherein the plurality of transmission modes comprises a plurality of digital signal transmission protocols carried over a communication medium selected from a group consisting of fiber optic cables, wireless channels and third party communication lines.

13. The system of claim 7 wherein the service attribute data comprises data concerning network communication resources that are currently available and network communication resources that can be built, deployed, or installed.

14. A system for generating a configuration of communication resources and transmission modes within a network comprising a plurality of network nodes, a plurality of traffic aggregation points, and at least one carrier network providing an interface between the network nodes and a wide area network, the system comprising:
means for determining a plurality of backhaul costs, each backhaul cost corresponding to a cost of establishing a communication channel between a given one of the plurality of network nodes and the carrier network using a given transmission mode;
means for determining a plurality of network nodes to include in a network configuration based at least in part on the determined backhaul costs; and
means for optimizing the network configuration, wherein optimizing the network configuration comprises at least in part, an optimal combination of traffic demand nodes served by the carrier network, backhaul costs, profitability of the traffic demand nodes, and the determined transmission mode(s).

15. The system as recited in claim 14 wherein the means for optimizing comprises:
a computer-readable medium having microprocessor-executable instructions; and
a microprocessor in communication with the memory, and operable to execute the instructions to carry out the optimizing.

16. The system as recited in claim 14, wherein the optimizing further comprises determining whether the configuration would be more optimal according to a specified criteria.

17. The system as recited in claim 16, wherein determining whether the configuration would be more optimal further comprises determining whether the specified criteria is optimized if one of the network nodes communicates with a traffic aggregation point that is different from a current traffic aggregation point.

18. The system as recited in claim 14, wherein the optimizing further comprises optimizing the configuration based on one or more network constraints.

19. The system as recited in claim 14 wherein the network configuration comprises one or more point-to-point connections between network nodes.

20. The system as recited in claim 14 wherein the network configuration comprises one or more point-to-multipoint connections between network nodes.

* * * * *